(12) United States Patent
Blum

(10) Patent No.: US 6,644,826 B1
(45) Date of Patent: *Nov. 11, 2003

(54) RECHARGEABLE LIGHT EMITTING BANDS

(76) Inventor: Alvin S. Blum, 2350 Del Mar Pl., Fort Lauderdale, FL (US) 33301

( * ) Notice: Subject to any disclaimer, the term of this patent is extended or adjusted under 35 U.S.C. 154(b) by 0 days.

This patent is subject to a terminal disclaimer.

(21) Appl. No.: 10/316,803

(22) Filed: Dec. 11, 2002

Related U.S. Application Data

(63) Continuation-in-part of application No. 10/074,820, filed on Feb. 13, 2002, now Pat. No. 6,558,018.

(51) Int. Cl.[7] .............................. F21L 4/08; F21V 21/08
(52) U.S. Cl. ....................... 362/183; 362/103; 362/191; 362/249
(58) Field of Search .......................... 362/84, 103, 105, 362/106, 108, 183, 227, 249, 251, 252, 473–475, 486, 543–545, 549, 398, 226, 190, 191

(56) References Cited

U.S. PATENT DOCUMENTS

| 3,008,040 A | * | 11/1961 | Moore | 362/105 |
|---|---|---|---|---|
| 3,250,909 A | * | 5/1966 | Oldenburger | 362/105 |
| 3,836,759 A | | 9/1974 | Silverman | 362/103 |
| 4,231,079 A | * | 10/1980 | Heminover | 362/106 |
| 4,521,832 A | | 6/1985 | Barbour | 362/103 |
| 4,812,953 A | | 3/1989 | Ask | 362/103 |
| 4,819,135 A | | 4/1989 | Padilla | 362/473 |
| 5,121,305 A | | 6/1992 | Deed | 362/473 |
| 5,245,517 A | | 9/1993 | Fenton | 362/156 |
| 5,268,826 A | * | 12/1993 | Greene | 362/183 |
| 5,566,384 A | | 10/1996 | Chien | 362/84 |
| 5,572,817 A | | 11/1996 | Chien | 40/544 |
| 5,688,038 A | | 11/1997 | Chien | 362/103 |
| 5,810,467 A | * | 9/1998 | Hurwitz | 362/106 |
| 5,823,653 A | | 10/1998 | Elam | 362/473 |

* cited by examiner

*Primary Examiner*—Alan Cariaso
(74) *Attorney, Agent, or Firm*—Alvin S. Blum

(57) ABSTRACT

Light apparatus for removably mounting on a person or an item to be illuminated. The apparatus has its own battery power supply mounted on a web of material. When the web is of pliant material, two opposed sides are provided with fasteners so that the web may be wrapped around an item or a person and the opposed sides then joined together to hold the apparatus in place. The battery is rechargeable, and a built-in battery charger is incorporated into the apparatus. Light emitters are powered by the battery and positioned to emit light that is readily seen. The lights may be light emitting diodes (LEDs), electroluminescent strips (EL), or incandescent bulbs. The lights may be flashing and/or sequencing for safety and/or decoration. Prongs are provided on the web for directly inserting into an electrical outlet to recharge the battery and support the apparatus on the outlet.

20 Claims, 3 Drawing Sheets

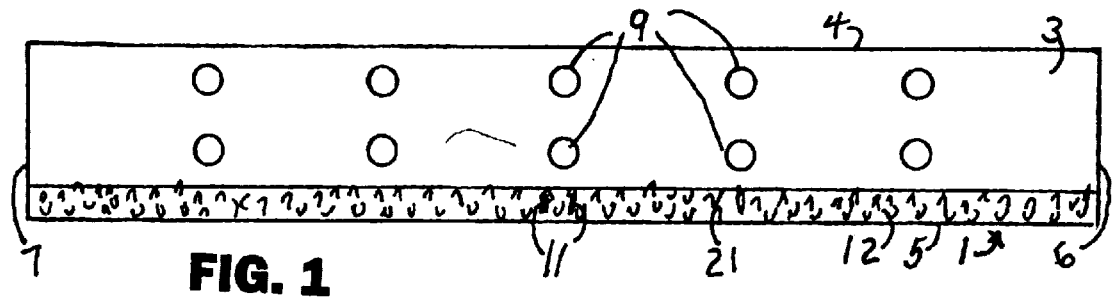
FIG. 1
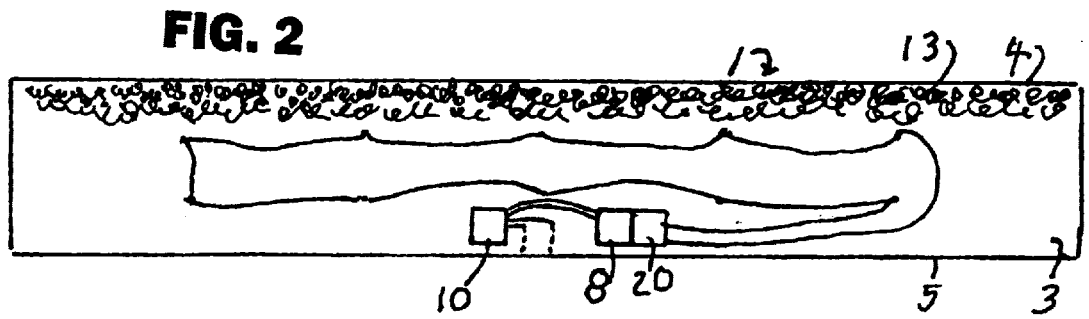
FIG. 2
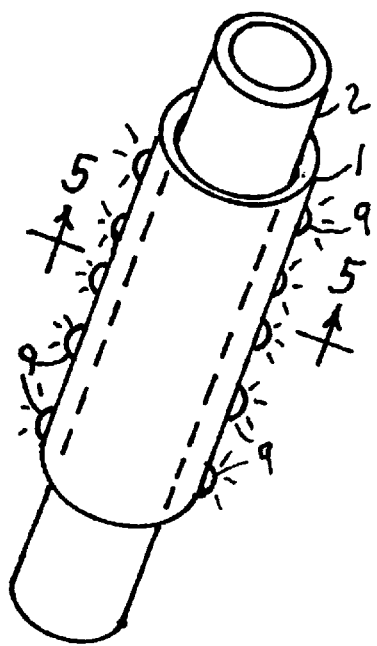
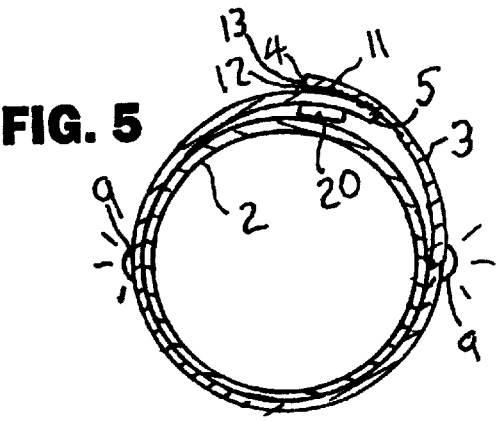
FIG. 4  FIG. 5

RECHARGEABLE LIGHT EMITTING BANDS

This patent application is a continuation in part of utility patent application serial No. 10/074,820 filed on Feb. 13, 2002 now U.S. Pat. No. 6,558,018.

This invention relates to lights for mounting on items or persons, and more particularly to a web with lights powered by rechargeable batteries that is removably attachable to an item or a person, the web carrying its own charging circuit.

BACKGROUND OF THE INVENTION

It is well known to provide electric lights on items or on persons for decoration and safety. The improvements in electroluminescent strip lights and light emitting diodes have engendered an increase in the number and variety of lights now available for these purposes. Most of these are powered by throw-away or rechargeable batteries. When a rechargeable battery is employed, the user must have a battery charger at hand by an electric power outlet, generally in a building. When the power is from a rechargeable battery, the battery must be removed from the apparatus and installed in the charger. This may be awkward and time consuming. It may also increase the cost and complexity of the apparatus to make the battery removable and provide a separate charger. Alternatively, the apparatus may have a particular connection for removably connecting to a battery charger that must be available.

SUMMARY OF THE INVENTION

It is accordingly an object of the invention to provide a light apparatus for removably mounting on an item such as a vehicle, a boat or a person that includes its own rechargeable battery. It another object that the apparatus includes its own battery charger. It is another object that the apparatus be readily applied and removed for easy recharging at an electric power outlet when required, or for security against theft. The light emitters may be light emitting diodes (LEDs), electroluminescent (EL), or incandescent lights. The materials may be mounted on a pliant web for conforming to, or wrapping around an object, or an arm, leg, neck, or torso of a user. For recharging, the apparatus is removed and simply plugged into an electric outlet.

These and other objects, features, and advantages of the invention will become more apparent when the detailed description is studied in conjunction with the drawings in which like elements are designated by like reference characters in the various drawing figures.

BRIEF DESCRIPTION OF THE DRAWINGS

FIG. 1 is a plan view of the front face of an apparatus of the invention.

FIG. 2 is a plan view of the rear face of the apparatus of FIG. 1.

FIG. 4 is a perspective view of the apparatus of FIG. 1 in place on a tubular frame member of a vehicle.

FIG. 5 is a sectional view taken on line 5—5 of FIG. 4.

DETAILED DESCRIPTION OF PREFERRED EMBODIMENTS

Figure 3:
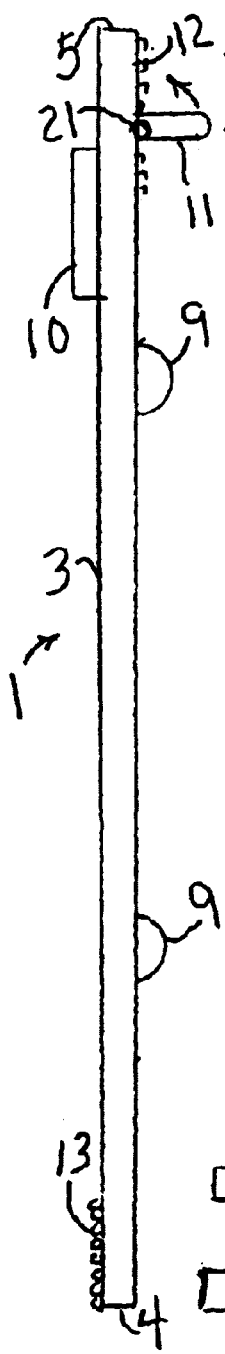
FIG. 3 is a side view of the apparatus of FIG. 1.

Referring now to the drawing FIGS. 1–6, the electrical light apparatus 1 of the invention comprises a rectangular web 3 of pliant material such as, but not limited to a fabric coated with a waterproofing material or a thin rubbery material that will lie flat, or be readily wrapped around an elongate member 2 of a person or object. The web 3 has first and second long sides, 4, 5, and first and second short sides, 6, 7. Along the first long side 4 is provided a strip of loop material 13. Along the second long side 5 is provided a strip of hook material 12 to provide adjustable means for joining the two long sides together around an elongate member with the hook and loop system that has the trade name VELCRO. Mounted on the web 3 are a rechargeable battery 8 connected to a battery charger 10. A control 20 may be a simple on/off switch or a flash sequencer well known in the art. It connects the battery to a plurality of LEDs 9. They may be arranged in two rows parallel to the long sides and so disposed that they are approximately diametrically opposed when wrapped around a tubular frame member so as to be visible from both sides of the vehicle. In order to recharge the battery 8, the battery charger 10 is connected to electrically conductive prongs 11 that are constructed for plugging into a remote stationary electric outlet. For this reason, it is desirable to make the apparatus easily removable from the elongate member. The prongs 11 are mounted on an elongate insulated bar 21 that runs parallel to the long sides. When the prongs are inserted into an electric outlet for charging the battery, the bar will hold the entire apparatus 1 against the wall. The prongs may be optionally constructed to pivot between a position parallel to the plane of the web for mounting on the vehicle, and a position orthogonal to that plane for recharging. The lights 9 may be connected in series as shown, series-parallel or parallel as desired. As best seen in FIG. 5, when the web 3 is wrapped around the vehicle member 2, the electrical components are protectively covered by the web, with only the lights 9 exposed on diametrically opposed sides of the member. The VELCRO components 12 and 13 join together to hold the apparatus securely in place. The on/off control 20 may be actuated by pressure applied to the exterior surface of the web. Some or all of the electrical components may be embedded in the web. A protective cover 23 may be provided for the prongs when not in use.

In an alternative embodiment (not shown), the lights may be incandescent bulbs.

Figure 7:
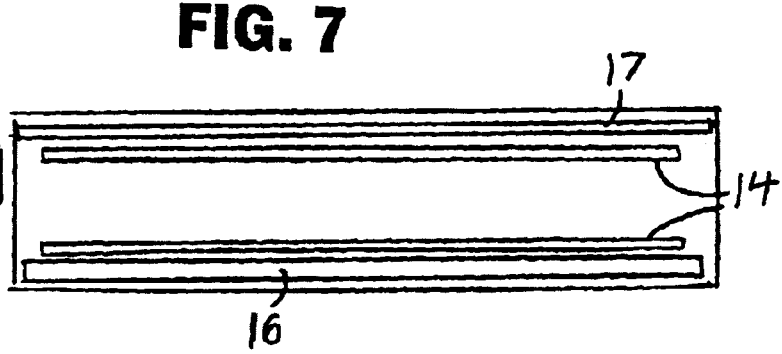
FIG. 7 is a plan view of the front face of another embodiment of the invention.
Figure 6:
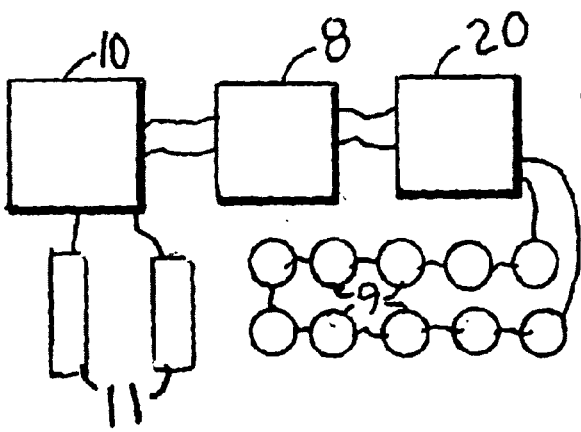
FIG. 6 is a schematic drawing of the apparatus of FIG. 1.
Figure 8:
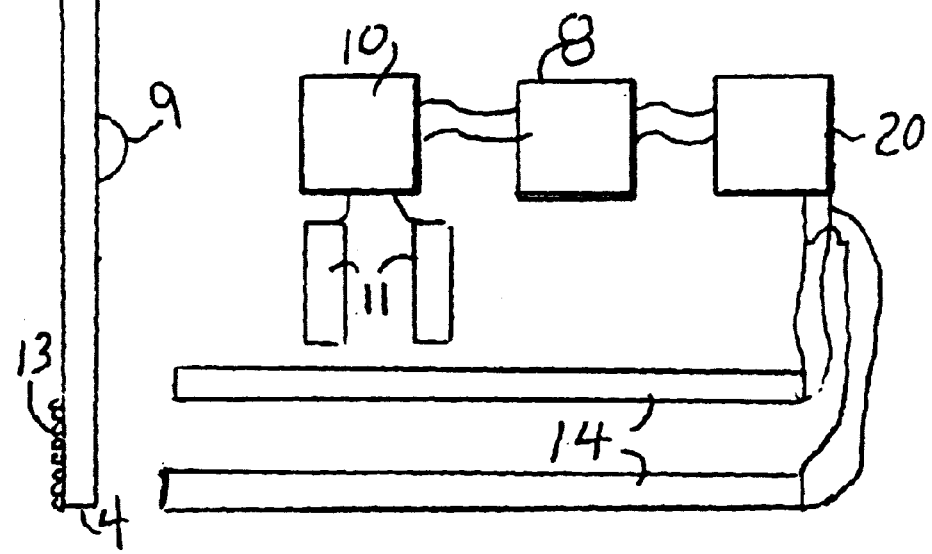
FIG. 8 is a schematic drawing of the apparatus of FIG. 7.

In an alternative embodiment shown in FIGS. 7 and 8, the lights 14 are electroluminescent strips. The means for fastening the long sides together are a magnetic strip 16 along a first long edge, and a metal strip 17 along a second long edge. Alternatively, the long sides may be joined together by other joining means such as the snaps (not shown). When the elongate member is iron, both long sides may be magnetic.

In an alternative embodiment (not shown) the web may be of rigid non-compliant material and mounted on an item by conventional removable means well known in the art such as hanging on a peg.

Figure 9:
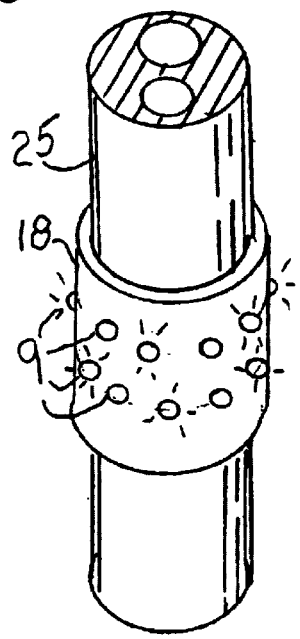
FIG. 9 is a perspective view of another embodiment of the invention in place on the arm of a person.
Figure 10:
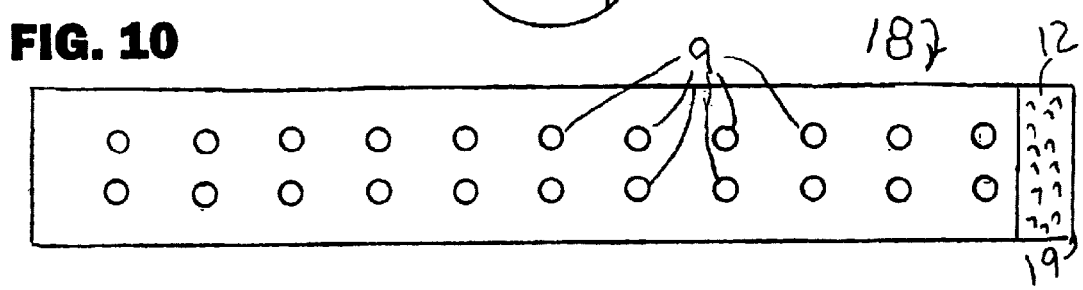
FIG. 10 is a plan view of the front face of the apparatus of FIG. 9.
Figure 11:
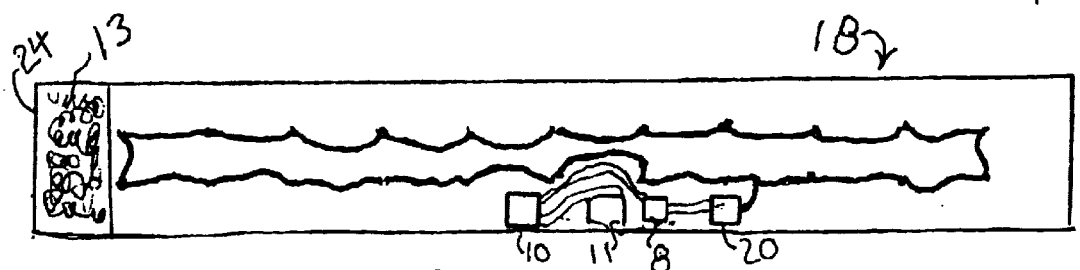
FIG. 11 is a plan view of the rear face of the apparatus of FIG. 9.

Referring now to the embodiment of the invention shown in FIGS. 9–11, an elongate band 18 is shown that is mounted on the arm 25 of a user for safety when walking in the dark or for ornamentation. A first short side 19 is provided with hooks 12 and a second short side 24 is provided with loops 13 on its reverse side.

While I have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. Electric light apparatus for removably mounting on a person or an item to be illuminated, the apparatus comprising:
   a) a web of pliant material having opposed sides;
   b) a rechargeable battery mounted on the web;
   c) at least one light emitter mounted on the web and operatively connected to the battery;
   d) a battery charger means mounted on the web and operatively connected to the battery for recharging the battery;
   e) electrically conductive prongs mounted on the web and operatively connected to the battery charger, the prongs adapted for plugging into a remote electrical outlet; and
   f) fastening means on the opposed sides for removably joining the two sides together around the person or item to be illuminated.

2. The apparatus according to claim 1 in which the prongs are adapted to support the apparatus when the prongs are plugged into the electrical outlet.

3. The apparatus according to claim 2 in which the at least one light emitter comprises an electroluminescent strip.

4. The apparatus according to claim 2 in which the at least one light emitter comprises a light emitting diode.

5. The apparatus according to claim 2 in which the at least one light emitter comprises two rows of light emitting diodes disposed parallel to one another.

6. The apparatus according to claim 2 in which the at least one light emitter comprises an incandescent light source.

7. The apparatus according to claim 2 in which the fastening means comprises a hook and loop fastener.

8. The apparatus according to claim 2 in which the fastening means comprises snap fasteners.

9. The apparatus according to claim 2 in which the fastening means comprises magnetic fasteners.

10. The apparatus according to claim 2 in which the prongs are constructed to be moveable between a plane parallel to the web plane and a plane orthogonal to the web plane for easier insertion into the outlet.

11. The apparatus according to claim 2 further comprising a removable cover for covering the prongs when mounted on the person or item.

12. Electric light apparatus for removably mounting on a person or an item to be illuminated, the apparatus comprising:
   a) a web of material;
   b) a rechargeable battery mounted on the web;
   c) at least one light emitter mounted on the web and operatively connected to the battery;
   d) a battery charger means mounted on the web and operatively connected to the battery for recharging the battery;
   e) electrically conductive prongs mounted on the web and operatively connected to the battery charger, the prongs adapted for plugging into a remote electrical outlet; and
   f) fastening means on the web for mounting on the person or item to be illuminated.

13. The apparatus according to claim 12 in which the prongs are adapted to support the apparatus when the prongs are plugged into the electrical outlet.

14. The apparatus according to claim 13 in which the at least one light emitter comprises an electroluminescent strip.

15. The apparatus according to claim 13 in which the at least one light emitter comprises a light emitting diode.

16. The apparatus according to claim 13 in which the at least one light emitter comprises two rows of light emitting diodes disposed parallel to one another.

17. The apparatus according to claim 13 in which the at least one light emitter comprises an incandescent light source.

18. The apparatus according to claim 13 in which the prongs are constructed to be moveable between a plane parallel to the web plane and a plane orthogonal to the web plane for easier insertion into the outlet.

19. The apparatus according to claim 13 further comprising a removable cover for covering the prongs when mounted on the person or item.

20. Electric light apparatus for removably mounting on a person or an item to be illuminated, the apparatus comprising:
   a) a web of material;
   b) a rechargeable battery mounted on the web;
   c) at least one light emitter mounted on the web and operatively connected to the battery;
   d) a battery charger means mounted on the web and operatively connected to the battery for recharging the battery; and
   e) electrically conductive prongs mounted on the web and operatively connected to the battery charger, the prongs adapted for supporting the apparatus when the prongs are plugged into an electrical outlet to recharge the battery.

* * * * *